United States Patent
Gonion et al.

(10) Patent No.: US 12,299,447 B2
(45) Date of Patent: *May 13, 2025

(54) HARDWARE VERIFICATION OF DYNAMICALLY GENERATED CODE

(71) Applicant: Apple Inc., Cupertino, CA (US)

(72) Inventors: Jeffrey E. Gonion, Campbell, CA (US); Michael D. Snyder, Cedar Park, TX (US); Filip J. Pizlo, Capitola, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,582

(22) Filed: Oct. 11, 2023

(65) Prior Publication Data

US 2024/0045678 A1    Feb. 8, 2024

Related U.S. Application Data

(63) Continuation of application No. 17/348,565, filed on Jun. 15, 2021, now Pat. No. 11,816,484.
(Continued)

(51) Int. Cl.
*G06F 9/30* (2018.01)
*G06F 9/32* (2018.01)
(Continued)

(52) U.S. Cl.
CPC .......... *G06F 9/30054* (2013.01); *G06F 9/323* (2023.08); *G06F 9/45516* (2013.01);
(Continued)

(58) Field of Classification Search
CPC ............... G06F 9/3005; G06F 9/30054; G06F 9/30058; G06F 9/45516; G06F 21/53; G06F 9/323
See application file for complete search history.

(56) References Cited

U.S. PATENT DOCUMENTS 8,151,349 B1    4/2012    Yee et al.
8,850,574 B1    9/2014    Ansel et al.
(Continued)

FOREIGN PATENT DOCUMENTS

CN    104318135 B    4/2017
CN    107506644 A    12/2017
(Continued)

OTHER PUBLICATIONS

U.S. Appl. No. 17/348,576, Pizlo et al., filed Jun. 15, 2021.
(Continued)

*Primary Examiner* — Jacob Petranek
(74) *Attorney, Agent, or Firm* — Kowert, Hood, Munyon, Rankin & Goetzel, P.C.

(57) ABSTRACT

In an embodiment, dynamically-generated code may be supported in the system by ensuring that the code either remains executing within a predefined region of memory or exits to one of a set of valid exit addresses. Software embodiments are described in which the dynamically-generated code is scanned prior to permitting execution of the dynamically-generated code to ensure that various criteria are met including exclusion of certain disallowed instructions and control of branch target addresses. Hardware embodiments are described in which the dynamically-generated code is permitted to executed but is monitored to ensure that the execution criteria are met.

20 Claims, 10 Drawing Sheets

Related U.S. Application Data

(60) Provisional application No. 63/108,148, filed on Oct. 30, 2020.

(51) Int. Cl.
*G06F 9/455* (2018.01)
*G06F 21/53* (2013.01)
*H04L 9/08* (2006.01)

(52) U.S. Cl.
CPC ............ *G06F 21/53* (2013.01); *H04L 9/0894* (2013.01); *G06F 2221/033* (2013.01)

(56) References Cited

U.S. PATENT DOCUMENTS

| | | | |
|---|---|---|---|
| 9,390,260 | B2 | 7/2016 | Tan et al. |
| 10,409,600 | B1 | 9/2019 | Sierra et al. |
| 10,579,806 | B1 | 3/2020 | Pyo et al. |
| 10,810,305 | B2 | 10/2020 | Zhang et al. |
| 2004/0250105 | A1 | 12/2004 | Molnar |
| 2005/0273605 | A1 | 12/2005 | Saha et al. |
| 2009/0282477 | A1 | 11/2009 | Chen et al. |
| 2011/0138474 | A1* | 6/2011 | Yee ................... G06F 9/30061 726/26 |
| 2012/0042145 | A1 | 2/2012 | Sehr et al. |
| 2014/0325239 | A1 | 10/2014 | Ghose |
| 2015/0007142 | A1 | 1/2015 | Biffle et al. |
| 2017/0161498 | A1 | 6/2017 | Yavo |
| 2018/0253549 | A1 | 9/2018 | Yavo |
| 2019/0102540 | A1 | 4/2019 | Acar et al. |
| 2021/0203504 | A1 | 7/2021 | Brandt |

FOREIGN PATENT DOCUMENTS

| | | |
|---|---|---|
| CN | 111095249 A | 5/2020 |
| WO | 2016165446 A1 | 10/2016 |
| WO | 202096639 A1 | 5/2020 |

OTHER PUBLICATIONS

ISRWO, PCT/US2021/057172, mailed Feb. 18, 2022, 11 pages.
Office Action from U.S. Appl. No. 13/348,576 mailed Sep. 28, 2022, 7 pages.
Notice of Allowance in Chinese Appl. No. 202180073713.9 mailed May 8, 2024, 6 pages.

* cited by examiner

HARDWARE VERIFICATION OF DYNAMICALLY GENERATED CODE

The present application is a continuation of U.S. application Ser. No. 17/348,565, entitled "Hardware Verification of Dynamically Generated Code," filed Jun. 15, 2021, which claims priority to U.S. Provisional App. No. 63/108,148, entitled "Software Verification of Dynamically Generated Code," filed Oct. 30, 2020; the disclosures of each of the above-referenced applications are incorporated by reference herein in their entireties.

BACKGROUND

Technical Field

Embodiments described herein are related to managing dynamically-generated code in a computer system.

Description of the Related Art

Software code executed in a computers system can include static code and dynamically-generated code. Static code can be cryptographically signed by a trusted source, and thus can be authenticated and trusted for execution in the system (e.g., the code is trusted because it will not attempt any nefarious purpose or "attack" the system attempting to take control of the system or corrupt data in the system). Dynamically-generated code cannot be authenticated in this fashion, and thus is not trusted. Successfully executing dynamically-generated code without compromising security in the system is a challenge.

BRIEF DESCRIPTION OF THE DRAWINGS

The following detailed description refers to the accompanying drawings, which are now briefly described.

Figure 1:
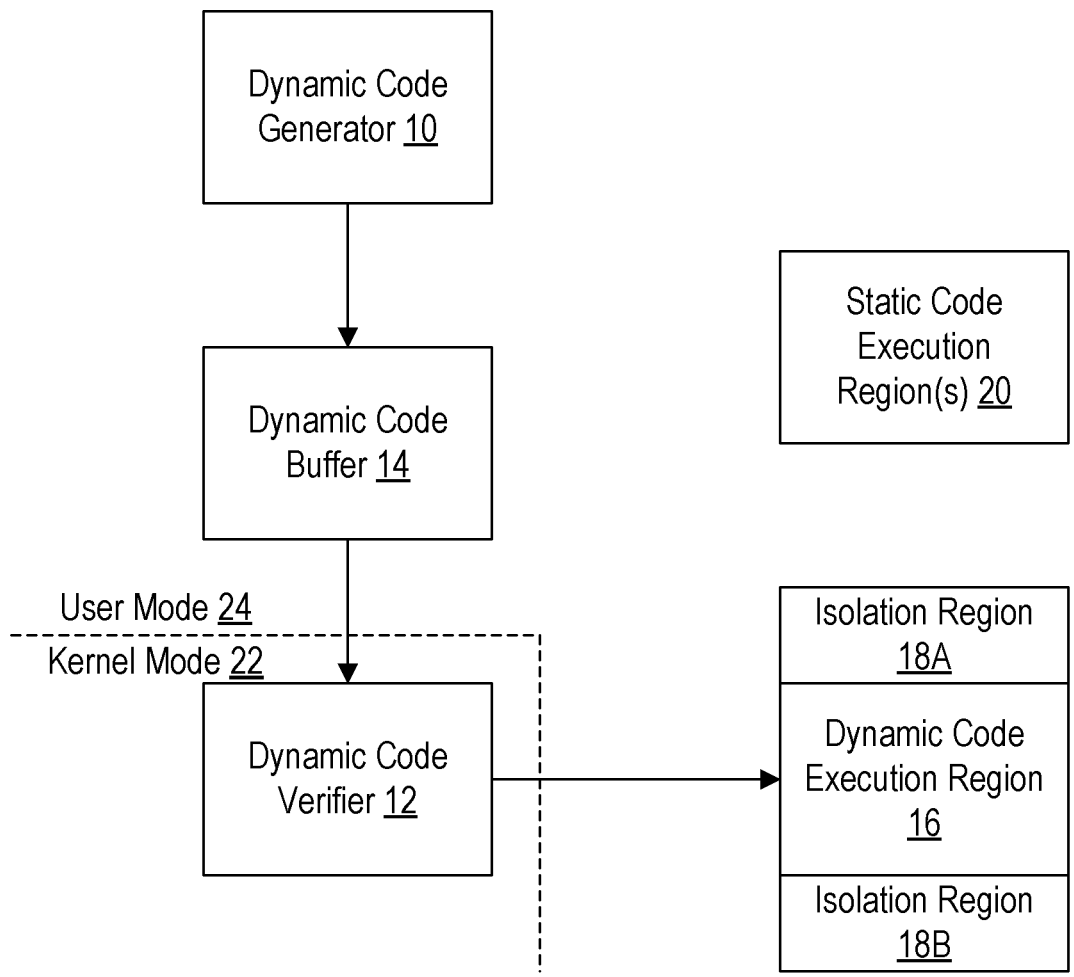
FIG. 1 is a block diagram illustrating one embodiment of dynamic code generation and verification.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

A variety of embodiments are described below for verifying that dynamically-generated code meets a set of criteria for execution in a system, prior to permitting the code to execute. Software-based embodiments will be described first with regard primarily to FIGS. 1-5, and then hardware-based embodiments primarily with regard to FIGS. 6-8.

Software Embodiments

FIG. 1 is a block diagram of one embodiment of a dynamic code generator 10 and a dynamic code verifier 12. Also illustrated in FIG. 1 are a dynamic code buffer 14, a dynamic code execution region 16 surrounded by isolation regions 18A-18B, and one or more static code regions 20. The blocks 14, 16, 18A-18B, and 20 may all be areas in a system memory in a computer system. For example, a memory address space addressable by read and write operations issued by one or more processors in a computer system may be mapped to the system memory. Similarly, the dynamic code generator 10 and the dynamic code verifier 12 may be code sequences stored in the system memory and executed by the one or more processors. The static code execution region(s) 20 and the dynamic code execution region 16 may also store code sequences to be executed by the one or more processors.

The dynamic code generator 10 may configured to generate dynamic code for execution in the system. "Dynamically-generated code" or "dynamic code" may refer to any code that is generated during execution of a program (e.g., "at runtime"), to be executed as part of the program. For example, some programming language implementations allow for just in time (JIT) compilation. Certain programming languages may experience higher execution performance when using JIT compilation, e.g., JavaScript. A JIT JavaScript implementation may compile JavaScript code, as the JavaScript code is executing, into binary instructions defined by the instruction set architecture implemented by the processors in the computer system. Another example of dynamically-generated code may be self-modifying code. As implied in the name, code in the program that is running generates new code for execution, or modifies previously-generated code, and then executes the newly generated or modified code. Another example of dynamically-generated code may occur when binary translation is employed. In binary translation, code expressed in one instruction set is translated to corresponding code in another instruction set, and the translated code is executed to implement the operation represented by the original code. Binary translation mechanisms may be static (e.g., a translation of the entire program prior to execution), dynamic (e.g., a translation of the program as the program is executing), or a combination of static and dynamic mechanisms. Generally, "code" or "code sequences" refer to a plurality of instructions defined in the instruction set architecture of the processors in the computer system, so that the processors may fetch the code and execute the code directly (e.g., in contrast to interpreted programs or the source program written in a given programming language that is compiled into executable code).

In contrast, "static code" or "statically-generated code" may refer to any program that is fully available in the system memory at the beginning of execution of the program (e.g., loaded into the system memory by the operating system or other control code based on a command to execute the program). Accordingly, the operating system kernel and/or system hardware may be "aware" of the entire program before the program begins executing. In some cases, programs are dynamically linked to other code (e.g., operating system-provided services or functions, other code that is available at runtime, etc.). However, the dynamically-linked code is also fully available at runtime and thus is statically generated. Static code may be loaded into the static code execution region(s) 20 for execution. The static code execution region(s) 20 may be controlled by the operating system to have only execute permission (or possibly read and execute permission), but not write permission. Thus, during static code execution, the static code may be immutable (e.g., not modifiable). The operating system itself (e.g., the kernel and various operating system services) may be in the static code execution region(s) 20 as well.

In some cases, statically-generated code may be cryptographically signed by the entity that generated the code or an entity that authorizes program execution on the computer system (e.g., the manufacturer of the computer system) and thus the entity is attesting to the veracity of the program and that the entity has verified that the program is not a nefarious attacker and/or does not attempt to perform operations that could compromise the integrity of the system. No such attestation may occur for dynamically-generated code.

In order to protect the computer system and other programs/data on the computer system from nefarious attack or even erroneous operation of a dynamically-generated code sequence, the dynamic code verifier 12 is provided. The dynamic code generator 10 may be configured to write the dynamically-generated code to the dynamic code buffer 14. Once the code is completed, the dynamic code generator 10 may attempt to initiate execution of the dynamic code, which may cause the dynamic code verifier 12 to verify the dynamically-executed code in the dynamic code buffer 14. The dynamic code verifier 12 may be transparent to the dynamic code generator 10 (e.g., the dynamic code generator 10 may not be "aware" that the dynamic code verifier 12 is instantiated and will be verifying the dynamically-generated code). Alternatively, the dynamic code generator 10 may be aware of the dynamic code verifier 12 and may cooperate with the dynamic code verifier 12 (e.g., initiation of execution may include communicating to the dynamic code verifier 12 that the dynamic code is available in the dynamic code buffer 14). In another embodiment, the dynamic code verifier 12 may operate in parallel with the dynamic code generator 10 as the dynamic code is generated.

As illustrated in FIG. 1, the dynamic code verifier 12 is executed in a kernel mode 22 of execution. The kernel mode 22 may be different from a user mode 24 of execution. The user mode 24 may be in effect for the dynamic code generator 10, the dynamic code execution region 16, and the static code execution region(s) 20. In an embodiment, some code in the static code executions region(s) 20 may also execute in kernel mode 22. The user mode 24 may have a lower privilege level than the kernel mode 22, for example. Higher privileged code may have access to restricted processor resources (and may modify those restricted resources) that lower privileged code cannot access (or at least cannot modify). The higher privileged code may also have control over the allocation of some resources (e.g., pages of memory) to the lower privileged code.

The dynamic code verifier 12 may be configured to analyze the dynamic code to ensure that certain properties are met by the code, to provide at least some assurance that the dynamic code is contained enough to prevent successful nefarious activity from the dynamic code or exploiting the dynamic code, and to prevent erroneous operation of the dynamic code from affecting other programs or the operating system itself. In one embodiment, the dynamic code verifier 12 may verify the code for movement to the dynamic code execution region 16. The dynamic code verifier 12 may analyze the dynamic code to ensure that any branches in the dynamic code may only have branch targets within the dynamic code execution region 16 or, if the target is outside the dynamic code execution region 16, the target is one of a plurality of valid target addresses. For example, target addresses in one of the static code execution regions 20 may be predefined (e.g., by the operating system) as valid target addresses for the dynamic code. For example, certain entry points to the kernel or operating system services may be permitted for dynamic code, and thus may be valid target addresses. Any set of valid target addresses may be defined in various embodiments. In one embodiment, the valid target addresses may be supplied to the dynamic code verifier 12 as a valid target list, locked in read-only memory prior to the generation of dynamic code. In another embodiment, the valid targets may be specified as gates (e.g., a vector of valid targets), and the dynamic code verifier 12 may be configured to ensure that any branches out of the dynamic code execution region 16 use a sequence that loads a recognized gate to which a branch (e.g., jump) is made.

In one embodiment, the dynamic code verifier 12 may verify other properties of the dynamic code. For example, some instructions defined in the instruction set architecture may not be permitted in the dynamic code (e.g., accesses to special purpose registers such as model specific registers or mode configuration registers in the processors, privileged instructions, etc.). Additional details are provided for one embodiment below.

An instruction set architecture may support "indirect branches," which form the target address from one or more register values (and possibly displacements coded into the branch instructions as well). Since the register values may generally be unpredictable (e.g., the register contents may be read from memory or computed via arithmetic/logic (ALU) instructions from other register contents), additional instructions may be used to limit the pointer generated to acceptable target addresses in an embodiment. More particularly, in an embodiment, indirect branches may be preceded by one or more other instructions that operate on the contents of the register or registers used by the indirect branch to form the target address. These other instructions may modify the contents of the register(s) to ensure that they cannot generate addresses outside of the dynamic code execution region 16 except to one of the valid target addresses in the valid target list (e.g., "caging" the target address, or "constraining" the target address, or "bounding" the target address). The one or more preceding instructions and the indirect branch instructions may be referred to as an "instruction packet" or simply "packet," and the dynamic code verifier 12 may verify that any indirect branch instructions instantiated in the dynamic code are included in a packet. In an embodiment, the dynamic code verifier 12 may further verify that the packet is aligned to a boundary that is defined based on the size of the packet. For example, in an embodiment, instructions may be 4 bytes in size and there may be 4 instructions in the packet (including the indirect branch instruction), for a packet size of 16 bytes. Such packets may be aligned to a 16 byte boundary. That is, the initial instruction in the packet is stored at an address having a number of least significant bits (LSBs) set to zero based on the size of the packet (e.g., 4 bits for a 16 byte packet). Other numbers of instructions, instructions sizes, and packet sizes may be supported in other embodiments, including smaller or larger numbers of instructions, instruction sizes, and packets sizes.

The caging/constraining/bounding instructions in an instruction packet may have any form. For example, the instructions may mask the register contents for an indirect branch to ensure that the enough LSBs are zero to align the target address to a packet boundary, and may mask the most significant bits (MSBs) to zero above the size of the dynamic code execution region 16. The masked value may be added to the base address of the dynamic code execution region 16, and the result may be the target address register for the indirect branch instruction. If multiple registers would be added together to produce a target address, or a displacement would be added, these additions may be performed initially and the result may be masked as noted above.

Other types of branch instructions may be instantiated in instruction packets as well. For example, explicit far calls and jump instructions (which are defined to have potentially far-reaching target addresses that could be outside the dynamic code execution region 16) may be required to be instantiated in instruction packets.

It is noted that the term "branch instruction" may refer to any type of instruction that causes (or may cause, for conditional branch instructions) the next instruction to be executed to be the instruction at the target address of the branch instruction. Other instructions (ALU instructions and load/store instructions, for example) cause the next instruction to be executed to be the instruction at the next sequential address after the current instruction, unless an exception is signaled on the instruction due to some erroneous occurrence during execution of the instruction. Exceptions cause the current code sequence to be flushed and the processor executes from a defined exception vector address for the exception. Examples of branch instructions are indirect branches, calls, returns, jumps (conditional or unconditional), conditional branches, relative branches having target addresses generated based on a displacement and the address at which the relative branch is stored, etc.

In an embodiment, the dynamic code generator 10 may insert no-operation instructions ("nops") in the dynamic code to ensure alignment of instruction packets. A nop may be an instruction that, when executed, does not affect the state of the processor executing the code, the state data in memory, or any other state in the computer system.

More specifically, in an embodiment, the instruction packets may ensure the following properties:

For explicit far jumps and calls, the target address is found on the valid target list (or a recognized gate) or the target is within the dynamic code execution region 16.

For register-based indirect branches (e.g., jumps, calls, and returns), the target address is bounded to the dynamic code execution region 16 and aligned to the boundary defined by the size of an instruction packet. Since instruction packets are also aligned to the same boundary, this rule ensures that one dynamically-generated indirect branch may not bypass the caging instructions for another indirect branch.

With the above constraints on indirect branches, exits out of the dynamic code execution region 16 may be limited to targets in the valid target list. Static code may jump (or "tail call," using a jump at the end of a function or other code sequence instead of a call instruction) to dynamic code, but a return from the dynamic code to the calling static code may use a "trampoline" mechanism in which the return is to a target address in the valid target list at which static instructions are instantiated to complete the return to the calling static code. Thus, a "trampoline" may be an intermediate code sequence between the calling/returning code (dynamic code or static code) and the called/returned to code (static code or dynamic code) to permit transitions between the calling/returning code through a controlled point, preventing the calling/returning code from having arbitrary access to the called/returned-to code. That is, in general, there may be a trampoline in the static code to control a call or return to the dynamic code, enforcing any restrictions on the static code that may be desired (e.g., ensuring that the static code enters the dynamic code at an appropriate point, including at the beginning of an instruction packet for a branch). There may be trampolines in the dynamic code to control a call or return to the static code, enforcing any restrictions on the dynamic code that may be desired (e.g., ensuring an appropriate entry point to the static code).

In an embodiment, the dynamic code verifier 12 may verify the dynamic code on an instruction-by-instruction basis. The dynamic code verifier 12 may verify, e.g., that instructions are well formed and have valid encodings. The dynamic code verifier 12 may verify that branches are part of one or more valid instruction packet types. For branches with explicit target addresses, the target addresses are verified to be on the valid target list or within the dynamic code execution region 16. Other indirect branches are verified to have their target register's content bound to the dynamic code execution register 16.

In one embodiment, the dynamic code verifier 12 may disallow the following instructions (instructions are from the ARM instruction set architecture for this example, but any other instruction set architecture may be used in various embodiments): branch-related pointer authentication instructions, instructions related to system calls (SVC), most move to/from system registers, hint instructions except nop, cache control instructions except dc, and illegal instruction encodings. The dynamic code verifier 12 may reject the instruction sequence if an inappropriate instruction sequence is found (e.g., terminating the process that includes the dynamic code, or "crashing" the process). More generally, the impermissible instructions may include any instructions that could be used to jump out of the dynamic code execution region 16 directly or indirectly to an unsafe address, or compromise the program through making an operating system call.

While the present embodiment uses instruction packets as discussed above, other embodiments may implement branch target constraints in other fashions. For example, rather than ensuring that all relative branches have target addresses that are aligned to instruction packet boundaries, an embodiment may track the location of instruction packets within the dynamic code and a relative branch to a non-boundary aligned target may be permitted if the target is not in an instruction packet. If the code at the non-boundary aligned target has not yet been encountered by the dynamic code verifier 12, the dynamic code verifier 12 may track the non-boundary aligned target as well and reject the dynamic code if the non-boundary aligned target is within an instruction packet (or is not found in the dynamic code at all, which may also be a nefarious activity or simply an error).

Another embodiment may employ pointer authenticated branches ("PAC branches") rather than or in addition to instruction packets. The PAC branches may be permissible, for example, if they are ensured to use a specific diversifier or key supplied by the operating system that the operating system uses to sign valid target addresses. In such an embodiment, the dynamic code verifier 12 may further ensure that the dynamic code does not use the specific diversifier/key to sign a pointer. Alternatively, more than one specific diversifier/key may be used and one of the specific diversifiers/keys may be used for branch target authentication and may not be used by the dynamic code to sign pointers, but other ones of the specific diversifiers/keys may be used by the dynamic code to sign and authenticate other pointers. There may be various mechanisms to ensure that the specific diversifier/key is used. For example, a register may be reserved (not permitted to be the destination of instructions in the dynamic code) and the specific diversifier/key may be stored in the reserved register. The dynamic code verifier 12 may verify that the reserved register is not the destination of instructions in the dynamic code and that the reserved register is used for pointer authentication.

The isolation regions 18A-18B may be provided, in an embodiment. The isolation regions 18A-18B may be inaccessible (e.g., read, write, and execute permissions may be off for the isolation region). Accordingly, any attempt to access the isolation regions 18A-18B from the dynamic code may cause an exception in the dynamic code. The operation system may terminate the process including the dynamic code if such an exception occurs, for example. In an embodiment, the isolation regions 18A-18B may be sized based on the largest displacement that a relative branch may have in the instruction set architecture. That is, the isolation regions 18A-18B may be at least large enough to contain any branch target address that may be generated by a relative branch instruction at any point in the dynamic code region 16. A given instruction set architecture supports a number of bits of displacement within a relative branch instruction, and the largest displacement is thus determined from the number of bits. Accordingly, a relative branch instruction placed at the smallest numerical address within the dynamic code execution region 16 and coded with the largest negative displacement will generate an address within the isolation regions 18A-18B (e.g., the isolation region 18B). Similarly, a relative branch instruction placed at the largest numerical address within the dynamic code execution region 16 and coded with the largest positive displacement will generate an address within the isolation regions 18A-18B (e.g., the isolation region 18A). With the use of the isolation regions 18A-18B, relative branch instructions may be permitted without any need to verify their target addresses by the dynamic code verifier 12. Correctly-coded relative branch instructions will have a target address within the dynamic code execution region 16, and incorrectly-coded relative branch instructions will cause an exception. Other embodiments may verify the target addresses of relative branch instructions and the isolation regions 18A-18B may not be needed, or may be sized based on other considerations.

In an embodiment, dynamic code that is verified as acceptable for execution by the dynamic code verifier 12 may be moved into the dynamic code execution region 16 (or each instruction may be moved as it is verified). The dynamic code verifier 12 may perform the move, or other code or hardware may perform the move, in various embodiments. In other embodiments, the dynamic code verifier 12 may verify the dynamic code in-place in the dynamic code buffer 14, and the dynamic code may be executed from the dynamic code buffer 14. That is, the dynamic code buffer 14 may also be the dynamic code execution region 16. In such an embodiment, the dynamic code buffer 14 may be surrounded by the isolation regions 18A-18B. Additionally, in such embodiments, the dynamic code verifier 12 or the operating system may ensure a read/write exclusivity property for the dynamic code buffer 14. That is, the dynamic code buffer 14 may be writeable but not executable, or executable but not writeable, but not both writeable and executable concurrently.

As mentioned above, the dynamic code verifier 12 may be part of the operating system (e.g., part of the kernel) and may thus run at a higher privilege level than user code such as the dynamic code generator 10. In a kernel-based implementation, for example, the dynamic code generator 10 may perform a system call to request that the code in the dynamic code buffer 14 be installed in the dynamic code execution region 16 for execution. Since the kernel executes at a higher privileged level than the dynamic code verifier 12, the kernel may provide itself a translation to the dynamic code execution region 16 with write permission. The lower privileged translation accessible to the dynamic code generator 10 and other user code may have execute permission (and perhaps read permission) but not write permission.

While the illustrated embodiment shows one dynamic code buffer 14 and one dynamic code execution region 16, there may be multiple dynamic code buffers 14 and/or dynamic code execution regions 16 in other embodiments.

Figure 2:
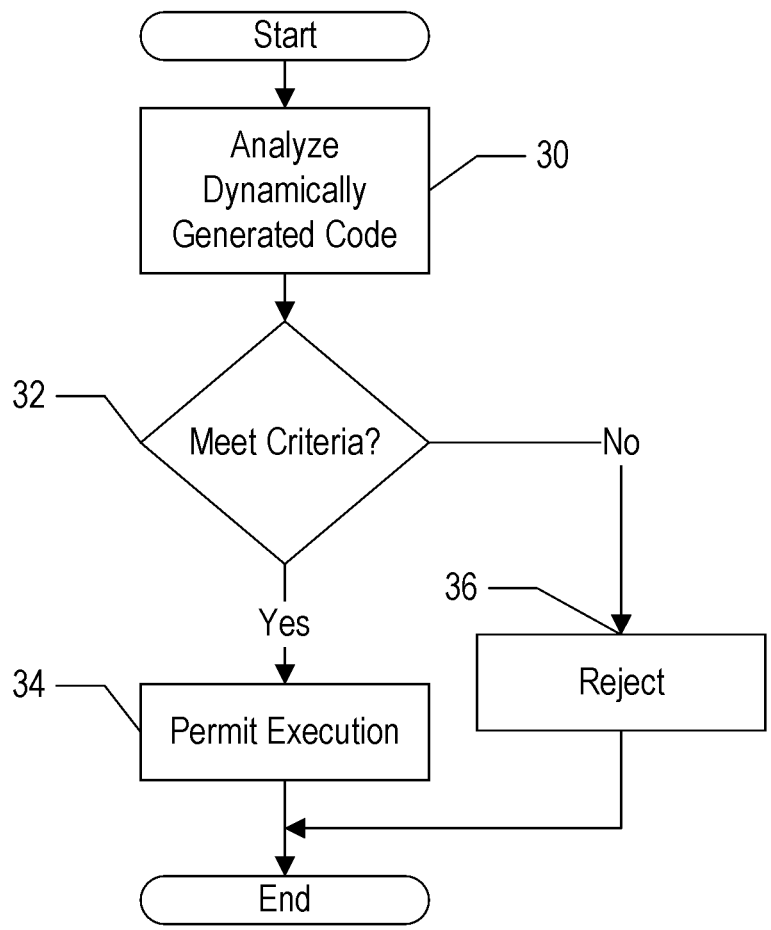
FIG. 2 is a flowchart illustrating one embodiment of dynamic code verification.

FIG. 2 is a high level flowchart illustrating operation of one embodiment of the dynamic code verifier 12. While the blocks are shown in a particular order, other orders may be used. The dynamic code verifier 12 may include a plurality of instructions which, when executed on a processor in a computer system, cause the computer system to perform the operations shown in FIG. 2.

The dynamic code verifier 12 may analyze the dynamically-generated code in the dynamic code buffer 14, applying the various rules and constraints described herein ("requirements" or "criteria") (block 30). If the dynamically-generated code meets the criteria (decision block 32, "yes" leg), the dynamic code verifier 12 may permit execution of the dynamically-generated code (e.g., copying the code to the dynamic code execution region 16—block 34). If the dynamically-generated code violates one or more of the criteria (decision block 32, "no" leg), the dynamic code verifier 12 may reject the dynamically-generated code (block 36). Rejecting the dynamically-generated code may be implemented in a variety of fashions. For example, the process that includes the dynamically-generated code may be terminated. In other embodiments, the dynamic code generator 10 may be informed that the dynamically-generated code failed verification. The reason for failure may be provided, or no reason may be given to protect security, in various embodiments.

Figure 3:
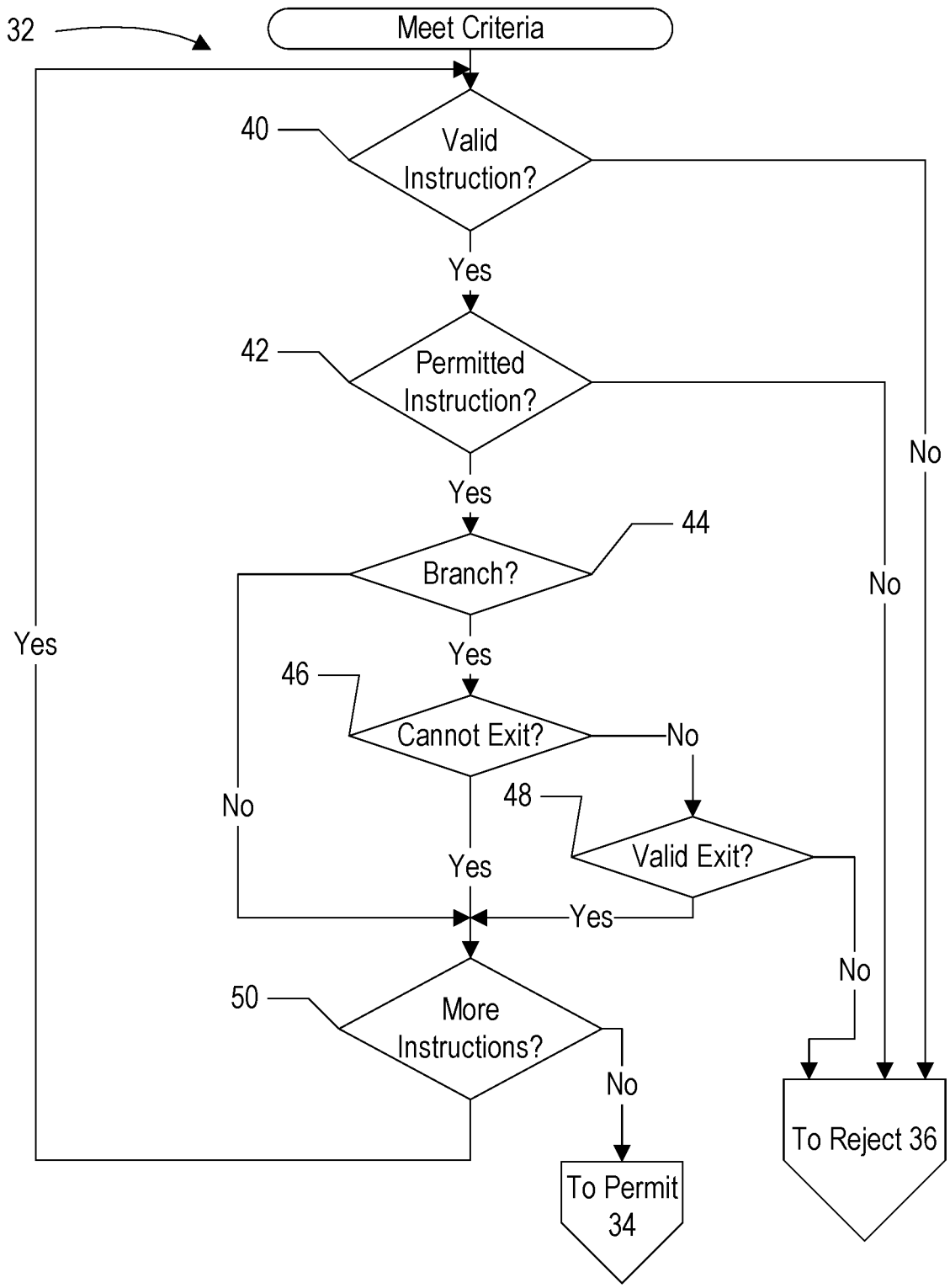
FIG. 3 is a flowchart illustrating one embodiment of a portion of the flowchart shown in FIG. 2 in greater detail.

FIG. 3 is a flowchart illustrating one embodiment of a portion of the flowchart shown in FIG. 2 in greater detail. More particularly, the determination of whether or not the dynamically-generated code meets the criteria for execution (decision block 32) is shown in more detail. While the blocks are shown in a particular order, other orders may be used. The dynamic code verifier 12 may include a plurality of instructions which, when executed on a processor in a computer system, cause the computer system to perform the operations shown in FIG. 3.

The dynamic code verifier 12 may analyze a given instruction and determine if the instruction is a valid instruction (decision block 40). For example, the dynamic code verifier 12 may verify that the opcode of the instruction is a valid opcode in the instruction set, the that operands and other coding of the instruction is consistent with the opcode, etc. If the instruction is not a valid instruction (decision block 40, "no" leg), the dynamic code verifier 12 may reject the dynamically-generated code (block 36). On the other hand, if the instruction is valid (decision block 40, "yes"

leg), the dynamic code verifier 12 may determine if the instruction is permitted in the dynamically-generated code (decision block 42). As mentioned above, certain instructions may not be permitted because of the potential risk that executing the instructions could lead to an exit from the dynamic code execution region 16. If the instruction is valid but not permitted (decision block 42, "no" leg), the dynamic code verifier 12 may reject the dynamically-generated code (block 36).

If the instruction is valid and permitted (decision blocks 40 and 42, "yes" legs), and the instruction is a branch (decision block 44, "yes" leg), the dynamic code verifier 12 may verify that the branch either cannot exit the dynamic code execution region 16 (decision block 46, "yes" leg) or, if the branch could exit (decision block 46, "no" leg) that the exit is a valid exit (e.g., the exit is to a permitted address outside of the dynamic code execution region—decision block 48, "yes leg). In either case, the branch instruction may be permitted in the dynamically-generated code. The dynamic code verifier 12 may determine if there are more instructions in the dynamically-generated code sequence and if so (decision leg 50, "yes" leg), may select the next instruction and repeat the analysis. In there are no more instructions (decision block 50, "no" leg), the dynamically-generated code may be permitted to execute (block 34). On the other hand, if the branch instruction can exit (decision block 46, "no" leg) and the exit cannot be verified as valid (decision block 48, "no" leg), the dynamic code verifier 12 may reject the dynamically generated code sequence (block 36).

The determination of whether or not a branch cannot exit, except to a valid exit, may be based on both the type of branch instruction and, for some types of branch instructions, the presence of other instructions that may limit the target address of the branch instruction to the dynamic code execution region 16 or to a valid exit. Thus, in some cases, a branch target address may not be determinable by the dynamic code verifier 12 and thus may be rejected even though it might, during execution, actually remain within the dynamic code execution region 16 or use a valid exit. That is, unless a branch can be proven to remain in the dynamic code execution region 16 or may be a valid exit, then the dynamically-generated code that includes the branch may be rejected.

Figure 4:
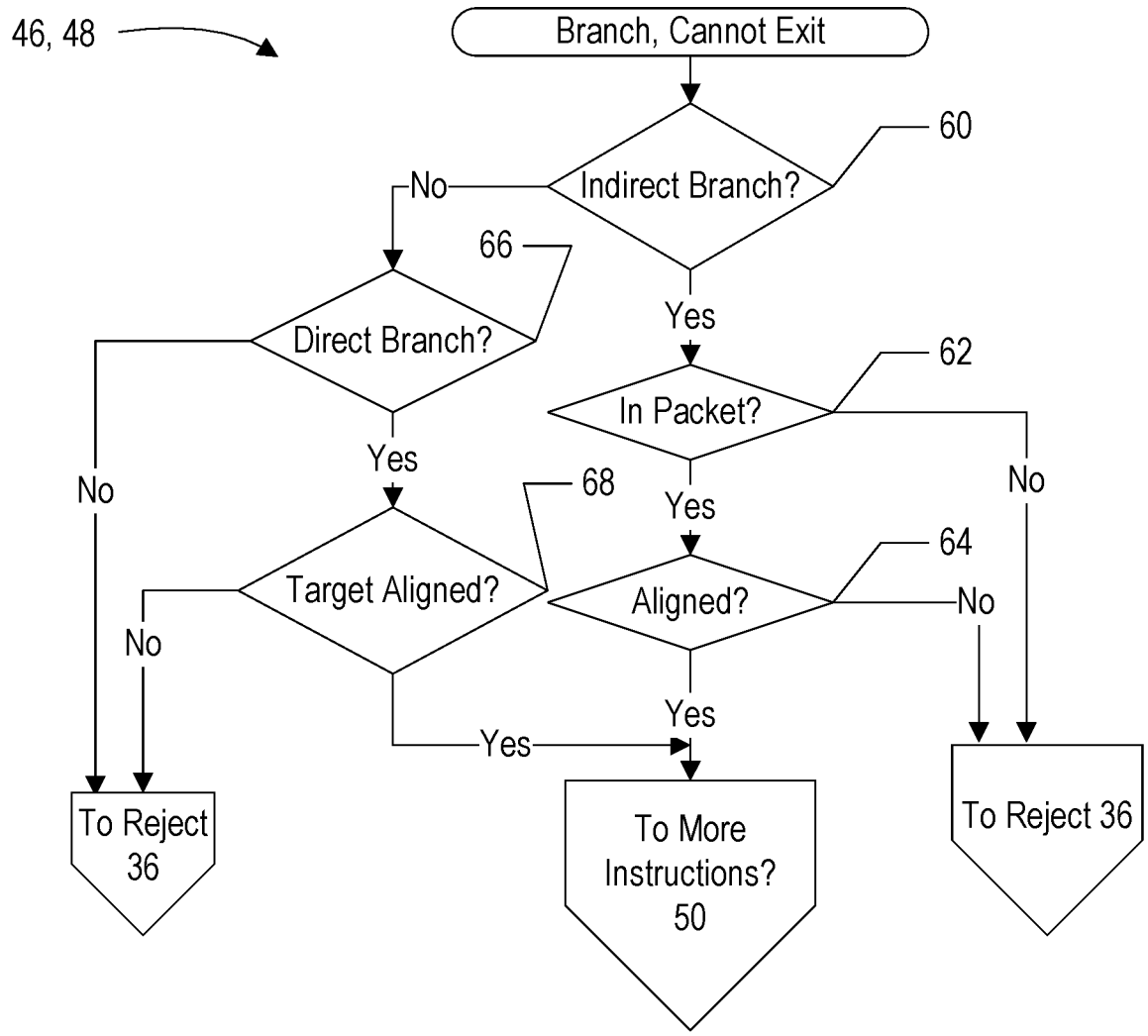
FIG. 4 is a flowchart illustrating one embodiment of a portion of the flowchart shown in FIG. 3 in greater detail.

FIG. 4 is a flowchart illustrating one embodiment of a portion of the flowchart shown in FIG. 3 in greater detail. More particularly, the combination of decision blocks 46 and 48 (determining that the branch cannot exit or is a valid exit) is shown in more detail. Thus, the operation of FIG. 4 may be performed once the dynamic code verifier 12 has determined that the instruction is a branch. While the blocks are shown in a particular order, other orders may be used. The dynamic code verifier 12 may include a plurality of instructions which, when executed on a processor in a computer system, cause the computer system to perform the operations shown in FIG. 4.

Branch instructions are generally instructions which may cause the next instruction to be executed to be an instruction either at the target address of the branch instruction or the next consecutive (sequential) instruction. Branch instructions may be unconditional (in which the target address is always the address of the next instruction to be executed) or conditional (in which the address of the next instruction may be either the target address or the sequential address based on a result of a previous instruction, communicated through a condition code in the processor or directly). Branch instructions may be indirect branches, in which at least one register operand is used to form the target address, or direct branches, in which the target address is formed from an immediate field (or displacement field) coded directly into the instruction. Direct branches may be absolute branches (target address is the displacement/immediate value) or relative (target address is determined based on the displacement/immediate field and the address of the branch instruction itself).

If the branch instruction is an indirect branch (decision block 60, "yes" leg), the branch instruction is required to be included within an instruction packet that ensures that the target address is within the dynamic code execution region 16 or is a valid exit. If the indirect branch is in an instruction packet with the correct set of instructions to bound the target address to the dynamic code execution region or to ensure that the target address is a valid exit (decision block 62, "yes" leg) and the instruction packet is aligned to an address that is a multiple of the size of the instruction packet (decision block 64, "yes" leg), the branch is valid and the dynamic code verifier 12 may process the next instruction (block 50). However, if the indirect branch is not in an instruction packet (decision block 62, "no" leg) or the instruction packet is not aligned (decision block 64, "no" leg), the dynamic code verifier 12 may reject the dynamically-generated code (block 36).

If the branch instruction is not an indirect branch (decision block 60, "no" leg) but is a direct branch (decision block 66, "yes" leg), the target address may be determined from the instruction itself (and potentially the address of the instruction itself). However, the target address may be required to be aligned to an instruction packet boundary, so that a direct branch may not be used to branch around the instructions in an instruction packet to an indirect branch, and thus possibly exit the dynamic code execution region to a non-valid target. If the target address is aligned (decision block 68, "yes" leg), the branch instruction may be permitted and the dynamic code verifier 12 may check for additional instruction (block 50). If the target address is not aligned (decision block 68, "no" leg), the dynamic code verifier 12 may reject the dynamically-generated code (block 36). Additionally, if the branch instruction is neither indirect nor direct (decision locks 60 and 66, "no" legs), the branch instruction is a type that is not permitted because the target address may not be guaranteed. Branch instructions that are neither direct nor indirect may include return instructions, which read a target address from a memory location, for example.

A more detailed example will now be presented that uses the ARM 64 instruction set, the dynamic code is JIT JavaScript Code, and the static code is precompiled C++ code (referred to as JIT code and C++ code, more briefly). However, other embodiments may use any instruction set, including other versions of the ARM instruction set, the Intel x86 instruction set, the Power instruction set, the RISC5 instruction set, etc. When example instruction sequences are shown, the instruction addresses (in hexadecimal notation, starting with "0x") and the instructions are shown in Anal Narrow font to set them apart from the rest of the text.

On ARM64 the greatest stride for a PC relative branch is 28 bits (±128M). As such, the allocation of the isolation regions 18A-18B may be at least 128M in size. In an embodiment, to simplify the target address bounding as well as to maximize address space entropy, the base address of the dynamic code execution region 16 may keep the smallest number of significant bits that vary for the dynamic code execution region 16 to a minimum. A masking sequence for register indirect address masking may be computed and saved in the same read-only configuration memory used by the valid target list, in an embodiment.

Literal Far Jump Packets

Packets with literal addresses, including patchable branches, may be generated with some changes depending on the target address. If the target address is outside the dynamic code execution region 16, the address may be required to be in the valid target list. For literal addresses inside the dynamic code execution region 16, the target address may be required to point to a packet boundary (e.g., a 16 byte boundary). The materialization of the literal address and the subsequent indirect branch may be emitted together as a packet with the first address of these instructions aligned to the packet boundary. In an embodiment, the macro assembler may assure that the materialized target address is aligned to a packet boundary.

Example Call to C++ Code
    0xe567ba160: movz x16, #0x8c48
    0xe567ba164: movk x16, #0x152, lsl #16
    0xe567ba168: movk x16, #0x1, lsl #32
    0xe567ba16c: blr x16

Example Call Targeting the Dynamic Code Execution Region 16
    0xe567b90e0: movz x16, #0x98c0
    0xe567b90e4: movk x16, #0x567b, lsl #16
    0xe567b90e8: movk x16, #e, lsl #32
    0xe56790ec: blr x16

Register Packets

Packets with the target address in a register may also be 16 byte aligned. The target addresses are aligned to 16 byte addresses and the target address is caged to point to the dynamic code execution region 16, modulo the isolation regions 18A-18B on either side of the actual dynamic code execution region memory. The same sequence of instructions may be used for jump, calls, and returns.

Example Call Packet
    0xe567bb308: ldr x8, [x2], #16
    ...
    0xe567bb320: and x8, x8, #0xfffff0
    0xe567bb324: movz x17, #0xe5, lsl #16
    0xe567bb328: add x8, x8, x17, lsl #12
    0xe567bb32c: blr x8

Note that, depending on the base address of the dynamic code execution region 16, the immediate values for the and, move, and add instructions may vary.

Example Return Packet
    0xe567b824c: ldp fp, lr, [sp], #16
    ...
    0xe567b8250: and lr, lr, #0xfffff0
    0xe567b8254: movz x17, #0xe5, lsl #16
    0xe567b8258: add lr, lr, x17, lsl #12
    0xe 567b825c: ret When the target address is in a static code execution region 20, a trampoline may automatically be created to tail call the targeted function. These trampolines may be in the form of literal packets.

PAC Signed Literal Packets

In one embodiment, PAC branches may not be permitted in the dynamic code. However, other embodiments may permit their use with an extended PAC branch packet along with validating that the target addresses are either in the valid target list or are 16-byte aligned and in the dynamic code execution region 16. The example instruction sequence below for making a signed indirect jump or call using a literal address includes 6 instructions: 4 to materialize a 64 bit signed pointer, 1 to materialize the tag or diversifier into lr (a temp register at this point), and then the authenticate and branch instruction. Adding two branches to this sequence allows it to be aligned on a 16 byte boundary and possible entry into the packet is safe. Below is an example of an 8 instruction packet with the added PC relative branches:
    0xe567bea60: movz lr, #0xb38a
    0xe567bea64: movz x16, #0x985c
    0xe567bea68: movk x16, #0x5a1, lsl#16
    0xe567bea6c: b 0xe567bea74
    0xe567bea70: b 0xe567bea60
    0xe567bea74: movk x16, #0xf501, lsl #32
    0xe567bea78: movk x16, #0xd840, lsl#48
    0xe567bea7c: blrab x16, lr Trampolines Between C++ and JIT Code Since JIT code is not permitted to return directly to C++ code due to the return address being caged to the dynamic code execution region 16, another technique may be used for these calls from the C++ code. There are also cases where a virtual call to a function may be made that could be in either the dynamic code execution region 16 or the static code execution region 20. Various trampolines may be used for these cases. Some of the trampolines may have tightly coupled components in both the static code execution region 20 and the dynamic code execution region 16. Trampolines used for calls from the C++ code may make the call in the dynamic code execution region 16 with the return to the static code execution region 20 via a valid target listed jump address.

Direct C++ Code to JIT Code Trampoline

Consider the main entry to JIT code from C++ code. This entry point is called vmEntryToJavaScript and includes an inline trampoline on the C++ side and a JIT component:

| C++ Region | JIT Region |
|---|---|
| JavaScriptCore`vmEntryToJavaScript: trampoline: | JIT code for VMEntryToJS |
| ... | 0xcc01bc000: and x0, x0, #0xfffff0 |
| 0x100739828 <+248>: adrp x13, 8059 | 0xcc01bc004: movz x16, |
| #0xcc, lsl #16 | |
| 0x1007398 2c <+252>: add x13, x13, #0x340 | 0xcc01bc008: add x0, x0, x16, lsl #12 |
| 0x100739830 <+256>: add x3, x13, #0x0 | 0xcc01bc00c: blr x0 |
| 0x100739834 <+260>: ldr x13, [x3] | 0xcc01bc010: movz x16, #0x983c |
| 0x100739838 <+264>: br x13 | 0xcc01bc014: movk x16, #0x73, lsl #16 |
| vmEntryReturn: | 0xcc01bc018: movk x16, #0x1, lsl #32 |
| 0x10073983c <+268>: sub sp, sp, #0x10 | 0xcc01bc01c: br x16 |
| 0x100739840 <+272>: sub x4, x29, #0xb0 | |
| 0x100739844 <+276>: ldr x1, [x4] | |

The way this trampoline works is that the return location, vmEntryReturn is placed in the valid target list. The JIT side code is generated expecting the target JIT entry point in the register x0. The JIT code bounds x0 to the dynamic code execution region 16 and then makes the call. Upon returning from that call, the JIT side of the trampoline makes a far jump to the valid target listed vmEntryReturn label. The resulting JIT code's start address is stored in a variable that is locked down as read only. The contents of that variable are used as the target in the C++ side. There are many other instances of these types of C++ calls to JIT trampolines, where the C++ calls through a function pointer to the trampoline in dynamic code execution region 16. The trampoline calls the JIT code and then returns back to the calling C++ code using a direct branch to a valid target. These trampolines are created when the JIT system is being initialized, before user code is JIT compiled and executed.

Callable C++ to JIT Trampoline

The trampolines described in the prior section may be sufficient, in an embodiment. Additional trampolines may be implemented as desired.

JIT to C++ Tail Call Trampoline

When a virtual call is made to a C++ function, we need to create a trampoline with the valid target listed entry point for that C++ function. We then use that trampoline similar to any other JIT function pointer. The trampoline makes a tail call to the C++ function.

Host Function Trampoline Thunk

0xe99e3cb50: movz x16, #0x56ec
    0xe99e3cb54: movk x16, #0x 1aa, lsl#16
    0xe99e3cb58: movk x16, #0x1, lsl #32
    0xe99e3cb5c: br x16

Linking and JIT Copying

When JIT code is copied from the dynamic code buffer 14 to the dynamic code execution region 16 and linked, the code passes through the dynamic code verifier 12 that checks that the instructions are safe. The dynamic code verifier 12 checks each instruction as it is copied, making sure that it is valid and if appropriate in a valid location of a packet. If instructions are copied without any validation failures, the code is made available for use by the VM. If there were any validation failures, the dynamic code verifier may terminate (crash) the process immediately.

Dynamic Code Verifier Instruction Validator

The instruction validator in the dynamic code verifier 12, in this embodiment, is built upon a refactoring of the ARM64 disassembler. A new isValid( ) method has been added to each instruction group in the disassembler. Most instruction groups perform simple validation, checking for undefined instruction patterns. Other instruction groups check for various disallowed instructions within that group. Branch instructions have more involved checks. Below are examples of the detailed checks made by one embodiment of the instruction validator.

Disallow invalid instructions encodings.
    Disallow svc, hvc, smc, hlt, or any of the dpcs instructions.
    Disallow authenticated branch instructions (braa, brab, blraa, blrab, blraaz, blrabz, braaz, brabz, eretaa, eretab, retaa, retab).
    Disallow mrs, msr, except the instructions that read user mode status flags.
    Check that bl and blr instructions are at addresses that end in 0xc.
    For indirect branches, check that the three preceding instructions are a series of move wide instructions with the same target register. If so, we check to see that the address materialized by that move wide sequence is either on the valid target list, to a 16 byte aligned target in the JIT region, or to the address 0. Branches to 0 are patched before they are actually used. If the three preceding instructions are not a series of move wide instructions to the same target register, we check that the three preceding instructions make up a valid JIT caging sequence.

In an embodiment, the system permits the ability to patch JIT code, quite often to replace branch targets, such as the branch to 0 instructions we emit with the intent they will be patched. Whenever the dynamic code verifier 16 is called, it validates from the prior 16 byte aligned boundary to the next 16 byte aligned boundary. In the case where a move wide sequence that materializes a 0 into a register followed by a branch via that register, when we validate the move wide sequence, we'll include the existing branch to verify that the combined branch packet abides by the packet rules.

Valid Target List Construction

Source annotations may be used to extract the valid targets in the statically-compiled C++ code. The source annotations may be compiler directives that take a function's address and stores that address into a read-only space in the object file. The code that actually creates the valid target list, reads the addresses from that read-only space and puts them in a statically sized hash table that can be locked down by making it read-only for the rest of the process' lifetime. The hash table only needs to answer the question, "Is this a valid target for JIT code to call?".

A source annotation for the function foo(), may look something like this:

| Original Code | With Valid Target Annotations |
|---|---|
| void foo( )<br>{<br>  ...<br>} | VALID_JIT_TARGET(foo);<br>void foo( )<br>{<br>  ....<br>} |

The VALID_JIT_TARGET annotation effectively creates the following additional source for the compiler:

```
void* __JITTarget__void
___attribute___((used, section("___DATA__CONST,___jit_targets"))) =
reinterpret_cast<void*>(foo);
```

In an embodiment, the valid target list creation may include compiler tooling that would aggregate the annotated function pointers and then create a read only hash table using perfect hashing. This may be similar to the process used when creating statically-generated C++ code.

Lockable Configuration Data

In several places in this example, various data is put into a read-only region. We have had this capability slightly longer than this software verified JIT effort. We use that memory region for many parts of this feature, including the valid target list, trampoline addresses, JIT region specifics and the register caging sequence. This region is available during process initialization. Before the JavaScript virtual machine is available, and therefore before JIT code derived from user provided JavaScript code run. After the JIT engine is initialized, we make the whole configuration region read-only. The OS does not provide a mechanism to revert the region back to read-write for the remaining lifetime of the process.

Computer System

Figure 5:
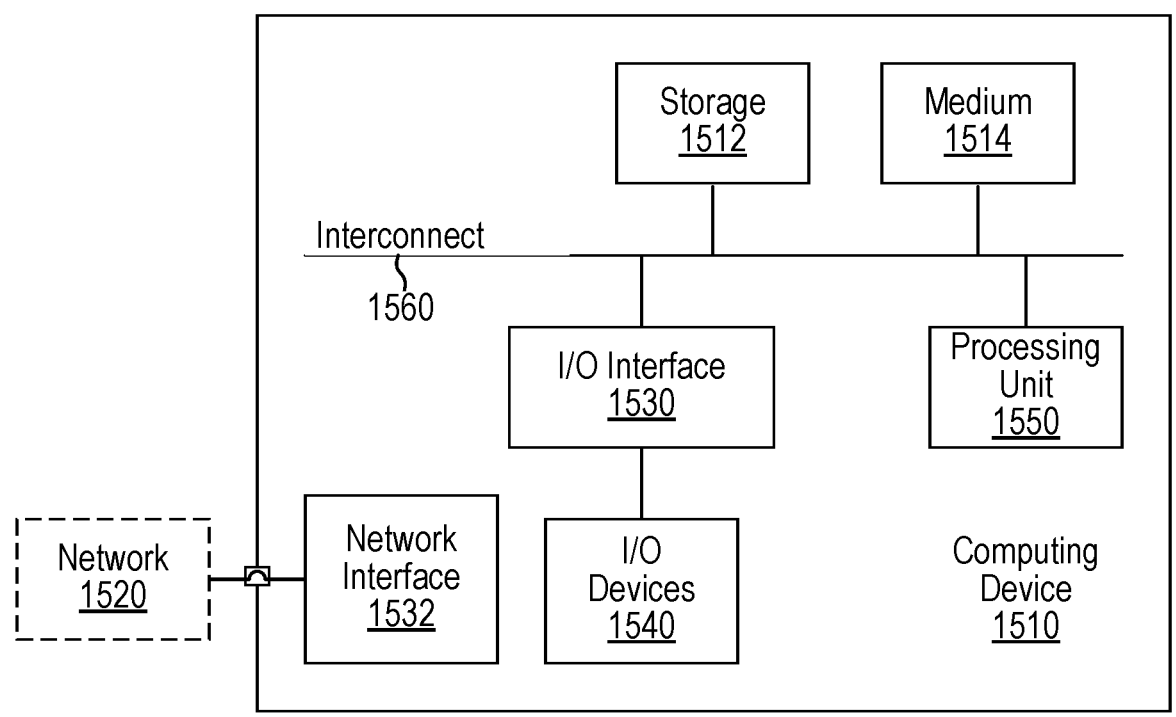
FIG. 5 is a block diagram of one embodiment of a computing device.

Turning now to FIG. 5, a block diagram of a computing device (which may also be referred to as a computing system or computer system) is depicted, according to some embodiments. Computing device 1510 may be used to implement various portions of this disclosure. Computing device 1510 is one example of a device that may be used as a mobile device, a server computing system, a client computing system, or any other computing system implementing portions of this disclosure.

Computing device 1510 may be any suitable type of device, including, but not limited to, a personal computer system, desktop computer, laptop or notebook computer, mobile phone, mainframe computer system, web server, workstation, or network computer. As shown, computing device 1510 includes processing unit 1550, storage subsystem 1512, and input/output (I/O) interface 1530 coupled via interconnect 1560 (e.g., a system bus). I/O interface 1530 may be coupled to one or more I/O devices 1540. Computing device 1510 further includes network interface 1532, which may be coupled to network 1520 for communications with, for example, other computing devices.

Processing unit 1550 includes one or more processors. In some embodiments, processing unit 1550 includes one or more coprocessor units. In some embodiments, multiple instances of processing unit 1550 may be coupled to interconnect 1560. Processing unit 1550 (or each processor within processing unit 1550) may contain a cache or other form of on-board memory. In some embodiments, processing unit 1550 may be implemented as a general-purpose processing unit, and in other embodiments it may be implemented as a special purpose processing unit (e.g., an ASIC). In general, computing device 1510 is not limited to any particular type of processing unit or processor subsystem.

Storage subsystem 1512 is usable by processing unit 1550 (e.g., to store instructions executable by and data used by processing unit 1550). Storage subsystem 1512 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1512 may consist solely of volatile memory in some embodiments. Storage subsystem 1512 may store program instructions executable by computing device 1510 using processing unit 1550, including program instructions executable to cause computing device 1510 to implement the various techniques disclosed herein. The storage subsystem 1512 may include, e.g., the system memory described above. In at least some embodiments, storage subsystem 1512 may represent an example of a non-transitory computer-readable medium that may store executable instructions.

In the illustrated embodiment, computing device 1510 further includes non-transitory medium 1514 as a possibly distinct element from storage subsystem 1512. For example, non-transitory medium 1514 may include persistent, tangible storage such as disk, nonvolatile memory, tape, optical media, holographic media, or other suitable types of storage. Although shown to be distinct from storage subsystem 1512, in some embodiments, non-transitory medium 1514 may be integrated within storage subsystem 1512. The non-transitory medium 1514 may also be an example of a medium which may store instructions which, when executed, cause the computing device 1510 to perform operations as described herein.

I/O interface 1530 may represent one or more interfaces and may be any of various types of interfaces configured to couple to and communicate with other devices, according to various embodiments. In some embodiments, I/O interface 1530 is a bridge chip from a front-side to one or more back-side buses. I/O interface 1530 may be coupled to one or more I/O devices 1540 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

In accordance with this disclosure, a method is disclosed. The method may comprise receiving, in a kernel executing in a kernel mode of execution that differs from a user mode of execution, a request to move a dynamically-generated code sequence from a buffer in memory to a dynamic code execution region in the memory; verifying, in the kernel executing in the kernel mode, that the dynamically-generated code sequence stored in a memory meets one or more criteria for execution in a computer system, wherein the one or more criteria include an absence of a subset of instructions that are not permitted in dynamically-generated code; and based on a successful verification, moving, by the kernel executing in the kernel mode, the dynamically-generated code sequence to the dynamic code execution region. The one or more criteria may also ensure that the dynamically-generated code sequence cannot exit the dynamic code execution region except to one or more predefined addresses. In an embodiment, ensuring that the dynamically-generated code sequence cannot exit may include ensuring that branch instructions in the dynamically-generated code sequence have target addresses within the dynamic code execution region or that the target addresses are one of the predefined addresses. In an embodiment, a first branch instruction in the dynamically-generated code sequence may be included in an instruction packet with one or more preceding instructions that limit a first target address of the first branch instruction to the dynamic code execution region. In an embodiment, the instruction packet may be aligned to a boundary that is based on a size of the instruction packet. In an embodiment, the one or more criteria may further include an absence of branch target addresses that are within the instruction packet. In an embodiment, the method may further comprise: receiving, in a kernel executing in the kernel mode, another request to move a second dynamically-generated code sequence from the buffer in memory to the dynamic code execution region in the memory; determining, in the kernel executing in the kernel mode, that the second dynamically-generated code sequence stored in the memory does not meet at least one of the one or more criteria for execution in the computer system; and based on determining that the second dynamically-generated code does not meet at least one or more criteria, preventing movement of the second dynamically-generated code sequence to the dynamic code execution region. In an embodiment, the method further comprises: receiving, in a kernel executing in the kernel mode, another request to move a second dynamically-generated code sequence from the buffer in memory to the dynamic code execution region in the memory; determining, in the kernel executing in the kernel mode, that the second dynamically-generated code sequence stored in the memory does not meet at least one of the one or more criteria for execution in the computer system; and based on determining that the second dynamically-generated code does not meet at least one or more criteria, rejecting the second dynamically-generated code sequence. In an embodiment, the method further comprises, based on an unsuccessful verification, terminating a process that transmitted the request to move the dynamically-generated code sequence to the dynamic code execution region.

In an embodiment, a non-transitory computer accessible storage medium may store a plurality of instructions which, when executed on a computer system, implement operations including: receiving, in a kernel executing in a kernel mode of execution that differs from a user mode of execution, a request to move a dynamically-generated code sequence from a buffer in memory to a dynamic code execution region in the memory; verifying, in the kernel executing in the kernel mode, that the dynamically-generated code sequence stored in a memory meets one or more criteria for execution in the computer system, wherein the one or more criteria include an absence of a subset of instructions that are not permitted in dynamically-generated code; and based on a successful verification, moving, by the kernel executing in the kernel mode, the dynamically-generated code sequence to the dynamic code execution region. In an embodiment, the one or more criteria may also ensure that the dynamically-generated code sequence cannot exit the dynamic code execution region except to one or more predefined addresses. In an embodiment, ensuring that the dynamically-generated code sequence cannot exit may include ensuring that branch instructions in the dynamically-generated code sequence have target addresses within the dynamic code execution region or that the target addresses are one of the predefined addresses. In an embodiment, a first branch instruction in the dynamically-generated code sequence may be included in an instruction packet with one or more preceding instructions that limit a first target address of the first branch instruction to the dynamic code execution region. In an embodiment, the instruction packet may be aligned to a boundary that is based on a size of the instruction packet. In an embodiment, the one or more criteria may further include an absence of branch target addresses that are within the instruction packet. In an embodiment, the operations may further include: receiving, in a kernel executing in the kernel mode, another request to move a second dynamically-generated code sequence from the buffer in memory to the dynamic code execution region in the memory; determining, in the kernel executing in the kernel mode, that the second dynamically-generated code sequence stored in the memory does not meet at least one of the one or more criteria for execution in the computer system; and based on determining that the second dynamically-generated code does not meet at least one or more criteria, preventing movement of the second dynamically-generated code sequence to the dynamic code execution region. In an embodiment, the operations may further include: receiving, in a kernel executing in the kernel mode, another request to move a second dynamically-generated code sequence from the buffer in memory to the dynamic code execution region in the memory; determining, in the kernel executing in the kernel mode, that the second dynamically-generated code sequence stored in the memory does not meet at least one of the one or more criteria for execution in the computer system; and based on determining that the second dynamically-generated code does not meet at least one or more criteria, rejecting the second dynamically-generated code sequence In an embodiment, the operations may further include: based on an unsuccessful verification, terminating a process that transmitted the request to move the dynamically-generated code sequence to the dynamic code execution region.

In an embodiment, a computer system may comprise: one or more processors; and a non-transitory computer accessible storage medium storing a plurality of instructions which, when executed on the computer system, implement operations including: receiving, in a kernel executing in a kernel mode of execution that differs from a user mode of execution, a request to move a dynamically-generated code sequence from a buffer in memory to a dynamic code execution region in the memory; verifying, in the kernel executing in the kernel mode, that the dynamically-generated code sequence stored in a memory meets one or more criteria for execution in the computer system, wherein the one or more criteria include an absence of a subset of instructions that are not permitted in dynamically-generated code; and based on a successful verification, moving, by the kernel executing in the kernel mode, the dynamically-generated code sequence to the dynamic code execution region. In an embodiment, the one or more criteria may also ensure that the dynamically-generated code sequence excludes branch instructions have target addresses outside the dynamic code execution region except to one or more predefined addresses.

Hardware Embodiments

In other embodiments, enforcement of the execution criteria on dynamically-generated code may be implemented in hardware (e.g., on one or more processors that execute the dynamically-generated code). The description above with regard to FIG. 1 may still generally apply, except that instead of the dynamic code verifier 12, the kernel mode 22 may include code that installs the dynamically-generated code into the dynamic code execution region 16. The processors may be programmed to identify the dynamic code execution region 16, and thus may enforce execution criteria on the dynamically-generated code by determining that execution is occurring within the dynamic code execution region 16. The execution criteria may differ in some cases as well, as described in more detail below.

Figure 6:
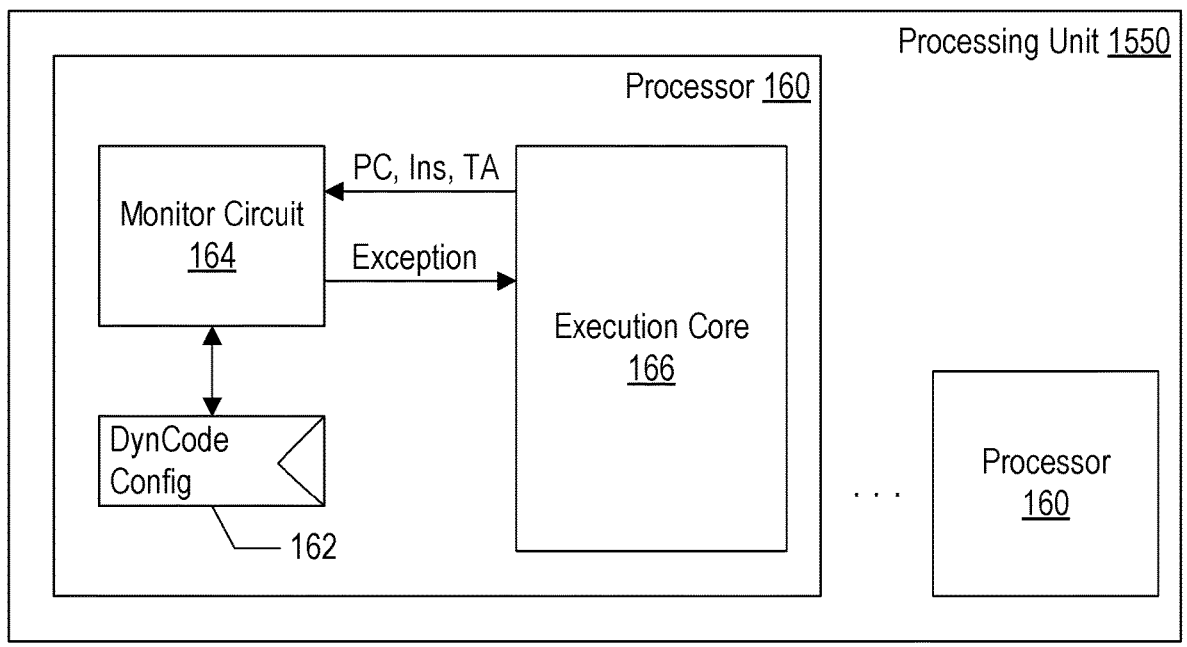
FIG. 6 is a block diagram of one embodiment of the processing unit shown in FIG. 5 in greater detail.

Turning now to FIG. 6, a block diagram of one embodiment of the processing unit 1550 is shown in greater detail. In the illustrated embodiment, the processing unit 1550 includes at least one processor 160. The processor 160 may include one or more configuration registers 162, a monitor circuit 164, and an execution core circuit (or more briefly, "execution core") 166. The configuration registers 162 may be programmable to define a dynamic code execution region 16 in memory. As previously discussed, the dynamically-generated code is executed in the dynamic code execution region 16 during use. The monitor circuit 164 is further coupled to the execution core 166. In some embodiments, more than one processor 160 may be included (e.g., a second processor 160 is shown in FIG. 6).

The monitor circuit 164 may be configured to monitor the dynamically-generated code sequence being executed in the processor 160 to ensure that the dynamically-generated code sequence meets one or more execution criteria. For example, the monitor circuit 164 may receive various data regarding the instructions being executed by the execution core 166, such as the program counter address (PC) at which the instruction is stored in memory and from which it was fetched, the instruction itself (or various signals decoded from the instruction, such as whether not it is a branch, type of branch, whether or not it is an instruction that is not permitted in dynamically-executed code, etc.), and the target address (TA) for branch instructions. The monitor circuit 164 may be configured to cause an exception in the processor based on detecting a violation of the one or more execution criteria (e.g., the monitor circuit 164 may assert an exception signal for the instruction to the execution core 166). The exception may cause the processor 160 to stop execution of the dynamically-generated code sequence and thus may prevent execution of code that violates the execution criteria. Accordingly, rather than checking the dynamically-executed code before permitting it to execute, the hardware embodiment may permit execution and terminate execution if the execution criteria are not met. The instruction packets used to bound the target addresses of indirect branches may not be employed in this embodiment, as the monitor circuit may detect if the target address exits the dynamic code execution region 16 and, if so, whether or not the exit is to a permitted target.

As mentioned previously, the execution criteria may include an absence of a subset of instructions that are not permitted in the dynamically-generated code sequence. The same subset of non-permitted instructions may be defined for this embodiment as for the software embodiments above. For example, the following instructions may be disallowed in dynamically-generated code sequences (instructions are from the ARM instruction set architecture for this example, but any other instruction set architecture may be used in various embodiments): unauthenticated indirect branch instructions, instructions related to system calls (SVC), most move to/from system registers, hint instructions except nop, cache control instructions except dc, and illegal instruction encodings. More generally, the impermissible instructions may include any instructions that could be used to jump out of the dynamic code execution region 16 directly or indirectly to an unsafe address, or compromise the program through making an operating system call.

Additionally, the processor 160 may support an additional set of cryptographic keys ("keys") for use by the dynamically-generated code sequence. The original set of keys ("standard keys") may be used by static code to sign pointers, including pointers to be used by the dynamically-generated code to branch out of the dynamic code execution region 16. Thus, code outside of the dynamically-generated code sequence may sign pointers with the standard keys and provide the signed pointers to the dynamically-generated code sequence for use, controlling the exit points from the dynamic code execution region 16. The additional keys ("dynamic code keys") may be used by the dynamically-generated code to sign pointers to target addresses within the dynamic code execution region 16, but if the dynamic code keys are used to sign pointers to addresses outside the dynamic code execution region, the pointers will fail authentication when an attempt is made to use the pointers. Thus, the dynamically-generated code may only use pointers to locations outside of the dynamic code execution region 16 if they were signed by the external code and provided to the dynamically-generated code. The separation of keys between the dynamically-generated code and the external code may permit, e.g., safe sharing of a common stack between the dynamically-generated code and the external code. In an embodiment, cryptographic sign/authenticate instructions in the dynamically-generated code may not be able to specify the standard keys (e.g., such instructions may be treated as nops by the processor 160 or may cause a fault). Thus, the standard keys may not be accessible to the dynamically-generated code. In addition, in one embodiment, there may be multiple standard keys. In such an embodiment, one of the standard keys may be made available to both dynamically-generated code and the external code, while another of the standard keys may be limited only to external code. In an embodiment, there may be separate programmable controls, one for the sign and authenticate instructions and one for authenticate branch/return instructions. If a sign instruction is executed and the corresponding control does not permit the sign operation, the processor 160 may "nop" the instruction (e.g., not execute the signature operation). Thus, a subsequent authenticate instruction (or authenticated branch instruction that uses the pointer) may fail the authentication. In a particular implementation, the ability to sign/authenticate may separately be controlled for signing/authenticating pointers that are outside the dynamic execution region and for signing/authenticating pointers that are inside the dynamic execution region.

In an embodiment, the processor 160 may also support "force signing" in which pointer signing instructions executed by external code are forced to be signed with the dynamic code keys so that they will correctly authenticate within the dynamic code execution region 16.

The configuration registers 162 may define the dynamic code execution region 16 (e.g., a base address and extent, a base address and an end address, etc.). Additionally, the configuration registers 162 may be programmed to select various other programmable attributes for dynamic code execution in they processor. For example, in one embodiment, the configuration registers 162 may be programmable with one or more address ranges outside of the dynamic code execution region 16. The dynamically-generated code may be permitted to sign pointers in the address ranges with the standard keys. This may be an exception to the general rule mentioned above that the dynamically-generated code is not permitted to sign pointers with the standard keys.

In an embodiment, the monitor circuit may permit direct branches to targets within the dynamic code execution region 16 but may force an exception if the direct branches have targets outside of the dynamic code execution region 16. In another embodiment, the isolation regions 18A-18B may be defined and may cover the maximum extent of a direct branch outside of the dynamic code execution region 16. The isolation regions 18A-18B may be marked as inaccessible (no read, write, or execute permissions), and direct branches to these targets may experience an exception in the execution core 166 due to the permission failures. In still another embodiment, the monitor circuit 164 may detect the target in the isolation regions 18A-18B and force the exception.

While the monitor circuit 164 is shown separate from the execution core 166 in FIG. 6 for clarity, the monitor circuit 164 may actually be integrated into the execution core 166, with the circuitry distributed over various pipeline stages at which monitor checks are made. Additionally, various embodiments of the execution core 166 may employ superscalar designs and the like to execute multiple instructions in parallel. Thus, the monitor circuit 164 may be configured to concurrently monitor multiple instructions in different pipelines, and may concurrently monitor instructions in different pipeline stages as well.

The execution core 166 may have any construction and microarchitectural features, in various embodiments. For example, the execution core 166 may include superscalar or scalar implementations. The execution core 166 may include in-order or out-of-order implementations, and speculative or non-speculative implementations. The execution core 166 may include any combination of the above features. The implementations may include microcode, in some embodiments. The execution core 166 may include a variety of execution units, each execution unit configured to execute operations of various types (e.g., integer, floating point, vector, load/store, etc.). The execution core 166 may include different numbers pipeline stages and various other performance-enhancing features such as branch prediction. The execution core 166 may include one or more of instruction decode units, schedulers or reservations stations, reorder buffers, memory management units, I/O interfaces, etc.

As mentioned previously, the processing unit 1500, including one or more processors such as the processor 160, may be deployed in a computer system such as the computing device 1510. The computer system may comprise a memory system (e.g., part of the storage 1512 and/or the medium 1514). The dynamic code execution region 16 may be defined in an address range within the memory system, wherein dynamically-generated code is executed in the dynamic code execution region during use. At least one processor 160 may be coupled to the memory system, wherein the processor includes a monitor circuit that is configured to monitor a dynamically-generated code sequence being executed in the computer system to ensure that the dynamically-generated code sequence meets one or more execution criteria, wherein the one or more execution criteria include an absence of a subset of instructions that are not permitted in the dynamically-generated code sequence, wherein the dynamically-generated code sequence is stored in the dynamic code execution region, and wherein the processor is configured to take an exception based on a detection of a violation of the one or more execution criteria. In an embodiment, the one or more execution criteria include a requirement that a branch target that is outside the dynamic code execution region is cryptographically signed with one of a set of one or more cryptographic keys. In an embodiment, the set of one or more cryptographic keys are not accessible to the dynamically-generated code sequence. In an embodiment, a second set of one or more cryptographic keys are provided for the dynamically-generated code sequence to cryptographically sign one or more target addresses into the dynamically-generated code sequence from an external source. In an embodiment, the one or more execution criteria include a requirement that the branch target is within one of one or more predefined address ranges outside of the dynamic code execution region. In an embodiment, the processor is configured to detect an attempt to access within a pair of address ranges adjacent to an address range corresponding to the dynamic code execution region and to prevent the access by taking an exception, and wherein a size of a given address range of the pair of address ranges is based on an extent that is reachable with a direct branch instruction at within the dynamic code execution region. In one embodiment, there may be separate programmable controls for the sign/authenticate instructions and the authenticated-branch/return instructions. The separate controls may provide the ability to separate the ability to sign pointer addresses while executing dynamically-generated code sequences from the ability of the dynamically-generated code sequences to authenticate and branch to properly "pre-signed" addresses provided by other code to the dynamically-generated code sequences, for example. In a particular implementation, the ability to sign/authenticate may separately be controlled for signing/authenticating pointers that are outside the dynamic execution region and for signing/authenticating pointers that are inside the dynamic execution region.

Figure 7:
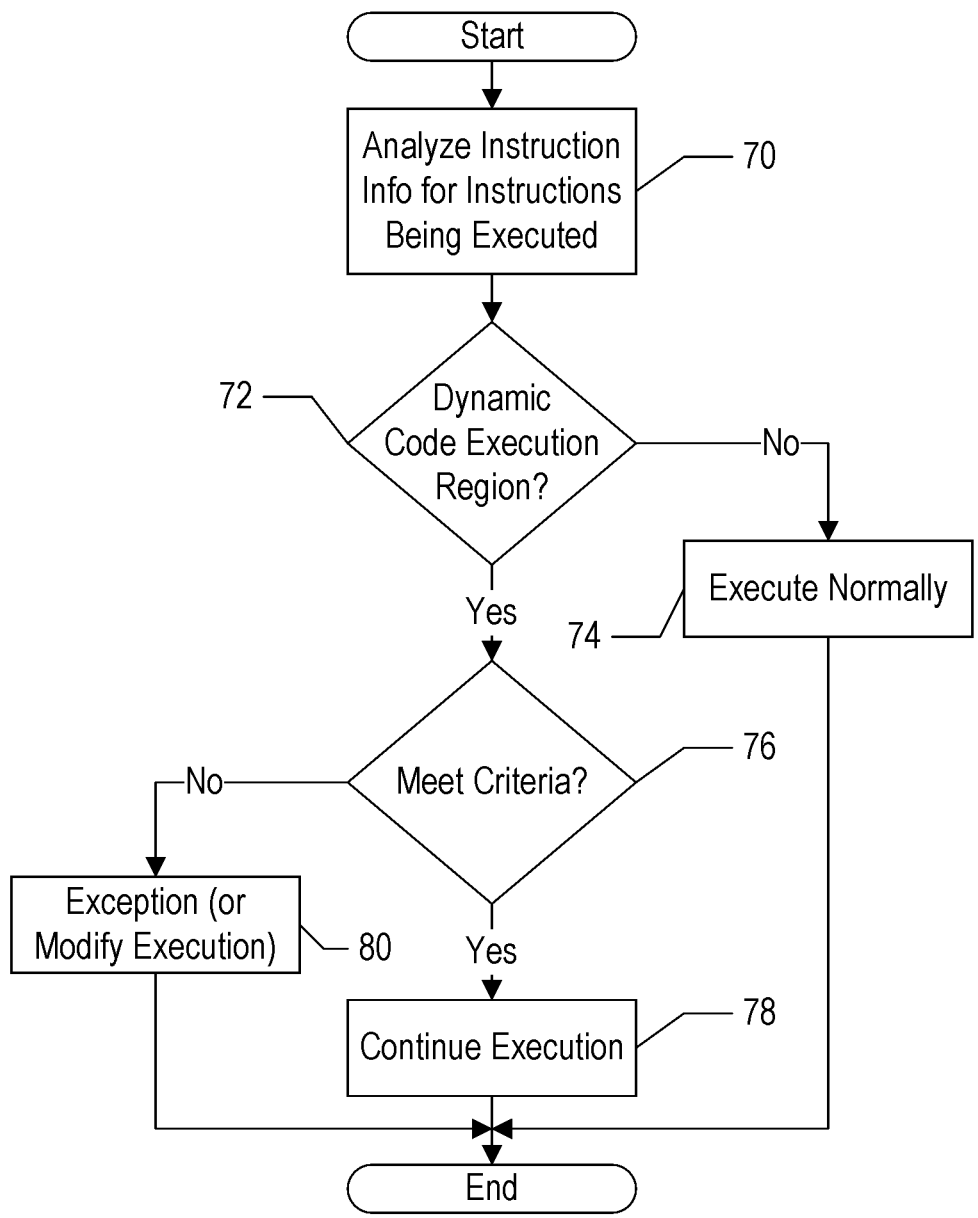
FIG. 7 is a flowchart illustrating operation of embodiment the processing unit shown in FIG. 6.

FIG. 7 is a flowchart illustrating operation of embodiment the processing unit 1550/processor 160 shown in FIG. 6. While the blocks are shown in a particular order for ease of understanding, other orders may be used. Blocks may be performed in parallel in combinatorial logic in the processor 160, and more particularly the monitor circuit 164. Blocks, combinations of blocks, and/or the flowchart as a whole may be pipelined over one or more clock cycles. The processor 160, and more particularly the monitor circuit 164, may be configured to implement that operation shown in FIG. 7.

The monitor circuit 164 may be configured to analyze the instructions being executed, using the instruction information such as the PC to determine when a dynamically-generated code sequence is being executed in the computer system to ensure that the dynamically-generated code sequence meets one or more execution criteria. The monitor circuit 60 may analyze the instruction information (block 70) and may detect whether or not the instructions are fetched from the dynamic code execution region 16 (decision block 72). If the instructions are not from the dynamic code execution region 16 (decision block 72, "no" leg), the instructions may execute normally according to the instruction set architecture implemented by the processor 160 (block 74). Normal execution may include detecting and taking various exceptions not related to the enforcement of execution criteria on dynamically-generated code (e.g., exceptions defined in the instruction set architecture such as for failed translations, attempts to execute privileged instructions in unprivileged modes such as user mode 24, etc.). If the instructions are from the dynamic core execution region 16 (decision block 72, "yes" leg), the monitor circuit 164 may determine whether or not the instructions meet one or more execution criteria (decision block 76). If the instructions meet the execution criteria (decision block 76, "yes" leg), the instructions may continue to execute normally (e.g., as defined in the instruction set architecture implemented by the processor 160, possibly modified for dynamic code execution as mentioned previously) (block 78). If the monitor circuit 164 detects a violation of the one or more execution criteria (decision block 76, "no" leg), the monitor circuit 164 may be configured to force an exception (block 80). That is, the monitor circuit 164 may cause the processor 160 (e.g., the execution core 166) to take an exception on the instruction that violates the execution criteria. In some cases, the monitor circuit 164 may be configured to modify the execution of an instruction rather than forcing an exception (block 80). For example, if the dynamically-generated code is not permitted to sign certain pointers (e.g., pointer outside the dynamic code execution region 16), the monitor circuit 164 may be configured to force a "nop" of the sign instruction.

It is noted that the operation of FIG. 7 (and FIG. 8, described below) may be performed in parallel on one or more instructions that are processed in parallel by the processor 160 (e.g., in superscalar fashion and/or in pipelined fashion).

Figure 8:
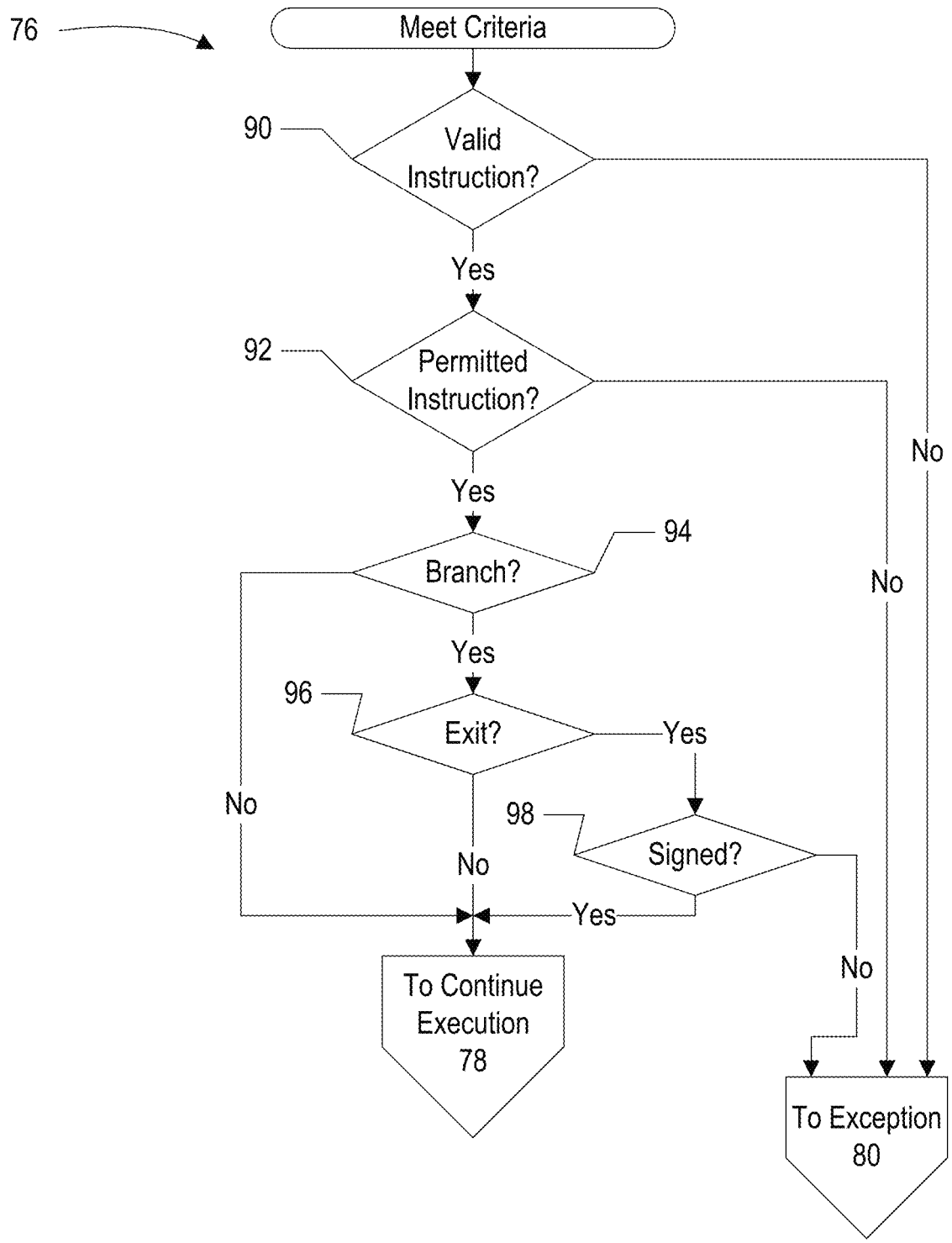
FIG. 8 is a flowchart illustrating one embodiment of a portion of the flowchart shown in FIG. 7 in greater detail.

FIG. 8 is a flowchart illustrating one embodiment of a portion of the flowchart shown in FIG. 7 in greater detail. More particularly, the determination of whether or not the instructions within the dynamic code sequence (fetched from the dynamic code execution region 16) meet the execution criteria is shown in more detail (decision block 76). While the blocks are shown in a particular order for ease of understanding, other orders may be used. Blocks may be performed in parallel in combinatorial logic in the processor 160 and more particularly the monitor circuit 54. Blocks, combinations of blocks, and/or the flowchart as a whole may be pipelined over one or more clock cycles. The processor 160, and more particularly the monitor circuit 164, may be configured to implement that operation shown in FIG. 8.

The monitor circuit 70 may determine whether or not the instruction is a valid instruction (e.g., the instruction has a valid opcode, operands are correct for the instruction, etc.) (decision block 90). If the instruction is invalid, the processor may take the exception (block 80). In an embodiment, the detection of an invalid instruction may be performed by the execution core 166 itself (e.g., as part of decoding the instruction). In other embodiments, the monitor circuit 164 may detect the invalid instruction or may receive an indication of the invalid instruction from the execution core 166. If the instruction is valid, the monitor circuit 164 may determine if the instruction is permitted (decision block 92). That is, one of the one or more execution criteria may include an absence of a subset of instructions that are not permitted in the dynamically-generated code sequence, and if the instruction is in the subset then it is not permitted. If the instruction is not permitted (decision block 92, "no"), the monitor circuit 164 may force the exception (block 80).

If the instruction is permitted and is a branch instruction (decision block 92, "yes" leg and decision block 94, "yes" leg), the monitor circuit 164 may determine if the branch instruction attempts to exit the dynamic code execution region 16 (decision block 96). That is, a branch instruction may attempt to exit the dynamic code execution region 16 if it has a branch target address that is outside the dynamic code execution region 16, the monitor circuit may determine if the branch target address is cryptographically signed with one of the standard keys (decision block 98). If not (decision block 98, "no" leg), the branch violates the execution criteria for dynamically-generated code and the monitor circuit may be configured to force the exception (block 80). If the branch target address is signed with one of the standard keys (decision block 98, "yes" leg), the instruction may be executed (block 78). As mentioned above, in an embodiment, the standard keys may not be accessible to the dynamically-generated code sequence. The dynamically-generated code sequence may have one or more dynamic code keys for cryptographic signing purposes (e.g., to cryptographically sign one or more target addresses into the dynamically-generated code sequence from an external source). In another embodiment, the branch target address may be valid and not violate the execution criteria if requirement the branch target address is within one of one or more predefined address ranges outside of the dynamic code execution region. The address ranges may be programmed into the configuration registers 162 for example. If the instruction is a branch instruction that does not exit the dynamic code execution region 16 (decision block 94, "yes" leg and decision block 96, "no" leg), or the instruction is not a branch (decision block 94, "no" leg), the instruction may continue to execute normally.

In an embodiment, the monitor circuit 164 (or the execution core 166, through permissions checks) may detect if a direct branch has a branch target address within the isolation regions 18A or 18B. If the direct branch does have such a target address in one of the pair of address ranges adjacent to the dynamic code execution region 16 (i.e., the isolation regions 18A-18B), the regions may be inaccessible to prevent relative branch instructions from exiting the dynamic code execution region. The size of a given address range of the pair of address ranges is based on an extent that is reachable with a given direct branch instruction within the dynamic code execution region.

Additional System Embodiments

Figure 9:
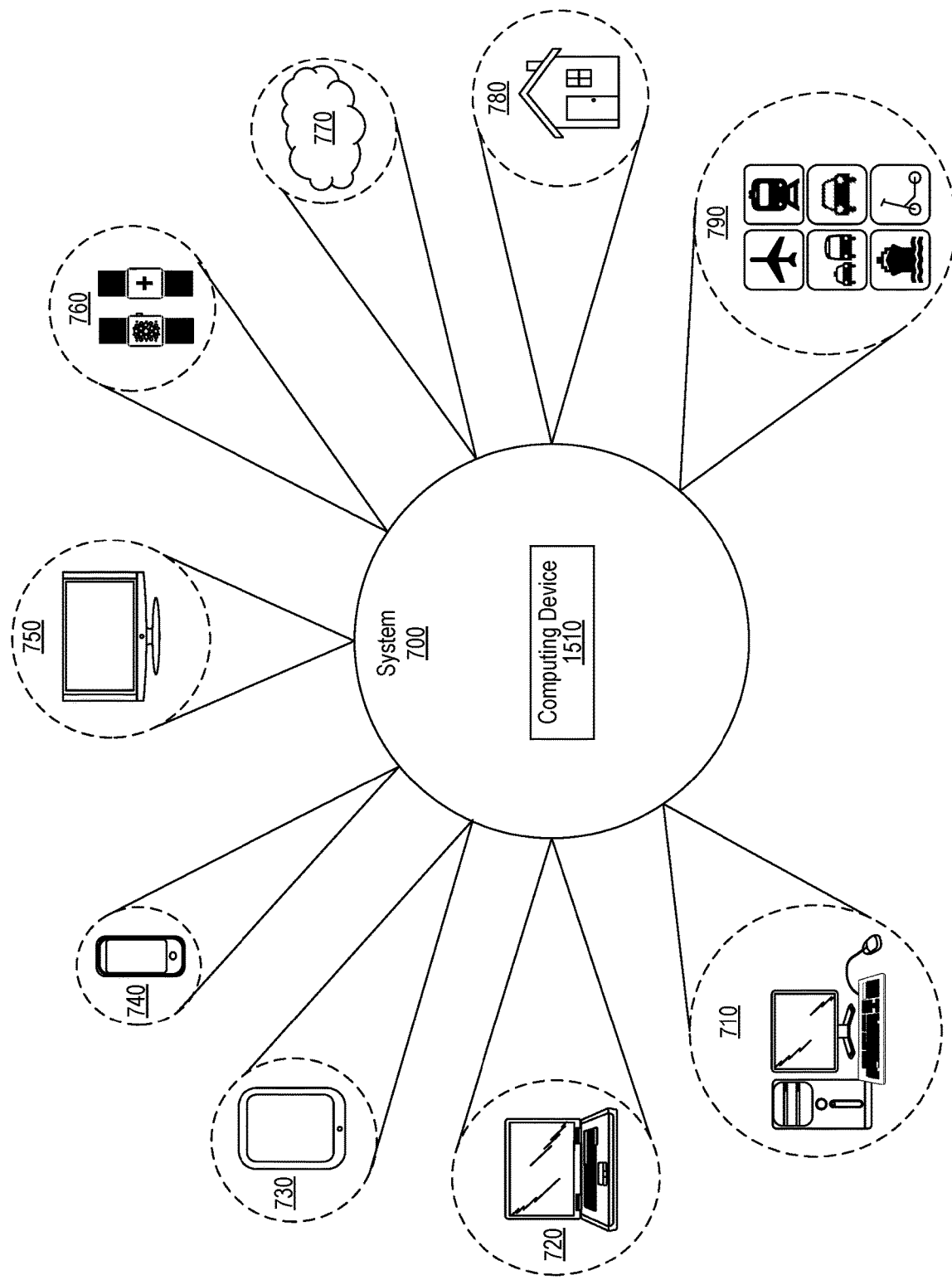
FIG. 9 is a block diagram of one embodiment of a computing device.

Turning next to FIG. 9, a block diagram of one embodiment of a system 700 is shown. In the illustrated embodiment, the system 700 includes at least one instance the computing device 1510. As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 9 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 9 are illustrative only and are not intended to be limiting. Other devices are possible and are contemplated.

Computer Accessible Storage Medium

Figure 10:
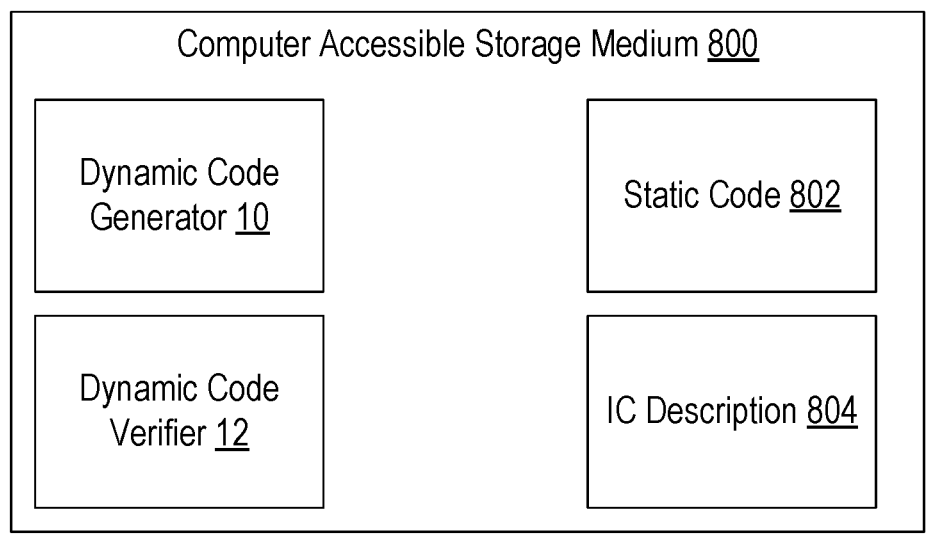
FIG. 10 is a block diagram of one embodiment of a computer accessible storage medium.

Turning now to FIG. 10, a block diagram of one embodiment of a computer accessible storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 10 may store one or more of the dynamic code generator 10, the dynamic code verifier 12, and/or static code 802, which may include various static code loaded into the static code execution region(s) 20 for execution. The dynamic code generator 10 may include a plurality of instructions which, when executed on a computer system, cause the computer system to perform operations including operations described above for the dynamic code generator 10. The dynamic code verifier 12 may include a plurality of instructions which, when executed on a computer system, cause the computer system to perform operations including operations described above for the dynamic code verifier 12. The static code 802 may include a plurality of instructions which, when executed on a computer system, cause the computer system to perform operations including operations described above for statically-generated code.

The computer accessible storage medium 800 may store a database 804 representing an integrated circuit. Generally, the database 804 may be a database which can be read by a program and used, directly or indirectly, to fabricate the hardware comprising the integrated circuit. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the integrated circuit. The netlist may then be placed and routed to produce a data set describing geometric shapes to be applied to masks. The masks may then be used in various semiconductor fabrication steps to produce a semiconductor circuit or circuits corresponding to the integrated circuit. Alternatively, the database 804 on the computer accessible storage medium 800 may be the netlist (with or without the synthesis library) or the data set, as desired.

While the computer accessible storage medium 800 stores a representation of the integrated circuit, other embodiments may carry a representation of any portion of the integrated circuit, as desired, including any subset of the components shown in FIG. 6. The database 804 may represent any portion of the above.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A method, comprising:
monitoring, by a monitor circuit of a computer system, a dynamically-generated code sequence being executed in the computer system to ensure that the dynamically-generated code sequence meets one or more execution criteria, wherein the one or more execution criteria specify that a branch target that is outside an execution region of a memory storing the dynamically-generated code sequence is permitted when the branch target is within one of one or more predefined address ranges outside of the execution region;
detecting, by the monitor circuit, a violation of the one or more execution criteria; and
forcing, by the monitor circuit, an exception based on detecting the violation.

2. The method of claim 1, wherein a set of cryptographic keys is provided to the dynamically-generated code sequence to cryptographically sign one or more target addresses into the dynamically-generated code sequence from an external source.

3. The method of claim 1, wherein a pair of address ranges adjacent to an address range that corresponds to the execution region are inaccessible to instructions in the dynamically-generated code sequence to prevent direct branch instructions from exiting the execution region.

4. The method of claim 3, wherein a size of a given address range of the pair of address ranges is based on an extent that is reachable with a given direct branch instruction within the execution region.

5. The method of claim 1, wherein the one or more execution criteria specify that dynamically-generated code sequences are prohibited from including an unauthenticated indirect branch instruction.

6. The method of claim 1, wherein the one or more execution criteria include a requirement that a branch target that is outside the execution region is signed with a key that is not accessible to the dynamically-generated code sequence.

7. The method of claim 1, wherein the execution region is defined by one or more registers of the computer system that are programmable.

8. A processor, comprising:
one or more registers programmable to define an execution region in a memory, wherein dynamically-generated code is stored in the execution region during use; and
a monitor circuit coupled to the one or more registers and configured to:
monitor a dynamically-generated code sequence that is being executed in the processor to ensure that the dynamically-generated code sequence meets one or more execution criteria, wherein the one or more execution criteria specify that a branch target that is outside the execution region is permitted when the branch target is within a predefined address range outside of the execution region; and
cause an exception in the processor based on a detection of a first particular violation of the one or more execution criteria.

9. The processor of claim 8, wherein the monitor circuit is configured to:
based on a detection of a second particular violation of the one or more execution criteria that pertains to signing a particular pointer, modify an execution of a sign instruction associated with the second particular violation.

10. The processor of claim 8, wherein the monitor circuit is configured to:
detect an attempt by the dynamically-generated code sequence to access an address within a pair of address ranges adjacent to an address range corresponding to the execution region; and
prevent the access by causing an exception in the processor.

11. The processor of claim 10, wherein a size of a given address range of the pair of address ranges is based on an extent that is reachable with a direct branch instruction within the execution region.

12. The processor of claim 8, wherein the one or more execution criteria specify that none of a set of prohibited instructions is present in the dynamically-generated code sequence.

13. The processor of claim 8, wherein the one or more execution criteria include a requirement that a branch target that is outside the execution region is signed with a key that is not accessible to the dynamically-generated code sequence.

14. The processor of claim 8, wherein the monitor circuit is configured to:
evaluate a program counter of the processor to determine when the dynamically-generated code sequence is being executed in the processor to ensure that the dynamically-generated code sequence meets one or more execution criteria.

15. A computer system, comprising:
a memory system, wherein a dynamic code execution region is defined in an address range within the memory system, and wherein dynamically-generated code is stored in the dynamic code execution region during use; and
at least one processor that is coupled to the memory system and configured to:
monitor a dynamically-generated code sequence being executed in the computer system to ensure that the dynamically-generated code sequence meets one or more execution criteria, wherein the one or more execution criteria specify that a branch target that is outside the dynamic code execution region is permitted when the branch target is within a predefined address range outside of the dynamic code execution region; and
take an exception based on a detection of a violation of the one or more execution criteria.

16. The computer system of claim 15, wherein the at least one processor is configured to provide a set of cryptographic keys to the dynamically-generated code sequence to cryptographically sign one or more target addresses into the dynamically-generated code sequence from an external source.

17. The computer system of claim 15, wherein the at least one processor is configured to enforce the one or more execution criteria on code based on a detection that execution of the code is occurring within the dynamic code execution region.

18. The computer system of claim 15, wherein the at least one processor is configured to detect an attempt to access within a pair of address ranges adjacent to an address range corresponding to the dynamic code execution region and to prevent the access by taking an exception, and wherein a size of a given address range of the pair of address ranges is based on an extent that is reachable with a direct branch instruction within the dynamic code execution region.

19. The computer system of claim 15, wherein the one or more execution criteria specify that a branch target that is outside the dynamic code execution region is cryptographically signed with one of a set of one or more cryptographic keys.

20. The computer system of claim 15, wherein the one or more execution criteria specify that dynamically-generated code sequences are prohibited from including illegal instruction encodings.

* * * * *